(12) United States Patent
Rayner (10) Patent No.: US 10,038,651 B2
(45) Date of Patent: Jul. 31, 2018

(54) ASYNCHRONOUS SWITCHING SYSTEM AND METHOD

(71) Applicant: Nevion Europe AS, Lysaker (NO)

(72) Inventor: Andrew Rayner, Felixstowe (GB)

(73) Assignee: Nevion Europe AS (NO)

( * ) Notice: Subject to any disclaimer, the term of this patent is extended or adjusted under 35 U.S.C. 154(b) by 83 days.

(21) Appl. No.: 15/256,707

(22) Filed: Sep. 5, 2016

(65) Prior Publication Data

US 2017/0070452 A1 Mar. 9, 2017

Related U.S. Application Data

(60) Provisional application No. 62/214,962, filed on Sep. 5, 2015.

(51) Int. Cl.
| | |
|---|---|
| H04L 29/06 | (2006.01) |
| H04L 12/939 | (2013.01) |
| H04L 12/931 | (2013.01) |
| H04L 12/861 | (2013.01) |

(52) U.S. Cl.
CPC ...... H04L 49/557 (2013.01); H04L 29/06027 (2013.01); H04L 49/35 (2013.01); H04L 49/602 (2013.01); H04L 49/90 (2013.01); H04L 69/08 (2013.01)

(58) Field of Classification Search
CPC ....... H04L 49/557; H04L 49/35; H04L 49/90; H04L 49/602; H04L 69/08; H04L 29/06027; H04L 12/185; H04L 65/80; G06F 17/5059; H04H 20/51; H04N 21/226; H04N 21/234309; H04N 21/23602; H04N 5/44582

See application file for complete search history.

(56) References Cited

U.S. PATENT DOCUMENTS

| | | |
|---|---|---|
| 5,636,210 A | 6/1997 | Agrawal |
| 6,493,357 B1 | 12/2002 | Fujisaki |
| 8,291,116 B2 | 10/2012 | Read |
| 8,375,339 B2 * | 1/2016 | Pinks ............... H04N 21/23602 725/109 |
| 9,762,973 B2 * | 9/2017 | Ribordy ................. H04H 20/51 |
| 2005/0169314 A1 | 8/2005 | Beaudoin |
| 2006/0109860 A1 | 5/2006 | Matsunaga |
| 2009/0097496 A1 | 4/2009 | Kakamura et al. |
| 2011/0122877 A1 * | 5/2011 | Gelke .................. H04N 21/226 370/400 |
| 2011/0265134 A1 * | 10/2011 | Jaggi .............. H04N 21/234309 725/109 |
| 2013/0022131 A1 * | 1/2013 | Ocon ...................... H04L 65/80 375/240.26 |
| 2014/0016638 A1 * | 2/2013 | Manohar ............. G06F 17/5059 716/103 |
| 2014/0184909 A1 * | 1/2014 | Chen ..................... H04L 12/185 370/390 |
| 2016/0029052 A1 * | 7/2014 | Laabs ................ H04N 5/44582 348/554 |

* cited by examiner

Primary Examiner — Le H Luu
(74) Attorney, Agent, or Firm — Paul D. Chancellor; Ocean Law (57) ABSTRACT

An asynchronous switching system and method for processing SDI data streams, the system and method utilizing one or more buffers for cleaning up an output of a dirty IP switch.

18 Claims, 6 Drawing Sheets

In a first step an IP switch such as an Ethernet/IP switch forwards source A to a cleanup switch serving destination 1
— 902

In a second step,, the cleanup switch receives source A and passes it through a buffer 1.
— 904

In a third step, a user selects source B for destination 1.
— 906

In a fourth step an SDN or equivalent stops forwarding source A and begins forwarding source B to destination 1; the ceasing and initiation of flows is done asynchronously to the video content.
— 908

In a fifth step the clean switch sees the cessation of flow from source A and to maintain the video output loops back to replay the last frame of video from the buffer 1.
— 910

In a sixth step, the cleanup switch sees the new feed from source B start to arrive and writes this into to buffer 2.
— 912

In a seventh step, when the new feed is established, detection of upon detection of the start of frame in the readout of the existing video repeat from buffer 1, the readout moves to taking its feed from buffer 2 (at the start of frame position).
— 914

In an eight step, when the next switch of incoming feed occurs, the process is repeated with transposed buffers.
— 916

ASYNCHRONOUS SWITCHING SYSTEM AND METHOD

PRIORITY AND INCORPORATION BY REFERENCE

This application claims the benefit of U.S. Provisional Patent Application No. 62/214,962 filed Sep. 5, 2015 which is incorporated herein by reference in its entirety and for all purposes. This application incorporates by reference in their entireties and for all purposes U.S. Pat. Nos. 6,493,357 B1 filed Mar. 22, 2000 and 8,291,116 B2 filed Jan. 5, 2009.

BACKGROUND OF THE INVENTION

Signals transported from a source to a destination can be switched. Current day practice in professional video environments typically involves use of cross point switches interconnecting devices with a serial digital interface (SDI).

SDI signals can be encapsulated in or mapped to packetized traffic such as Ethernet packets for transport on an internet protocol (IP) line segment where each video frame translates to a multitude of, e.g. a few thousand, packets.[1] In this IP environment, signals can be switched using widely deployed IP switching technologies available from a multitude of vendors including Cisco, Juniper Networks, and Alcatel-Lucent.

[1] See e.g., SMPTE 2022-6:2012, Transport of High Bit Rate Media Signals over IP Networks (HBRMT).

However, Ethernet switches do not provide for clean switching of video signals for reasons including their ignorance of video frame boundary locations in the packetized traffic. And, even if Ethernet switches included this capability, yet other problems arise in the context of switching non-aligned video streams.

FIELD OF INVENTION

This invention relates to the electrical and process arts. In particular, a system and method for switching video signals in provided.

DISCUSSION OF THE RELATED ART

Switching of packetized video signals is not unknown. However, the professional video industry has yet to find an effective IP solution for handling live production/real time operations with minimum latency where video streams can be switched without picture disruption.

SUMMARY OF THE INVENTION

The present invention provides for asynchronous switching with cleanup of the output of a dirty switch.

In an embodiment, an asynchronous video signal switching method comprises the steps of: providing first and second SDI signal sources and respective interconnected SDI to IP converters; providing an Ethernet/IP switch receiving IP outputs of the SDI to IP converters; providing a cleanup switch that receives the Ethernet/IP (EIP) switch output; via the EIP, initially forwarding signals from the first source to the cleanup switch and subsequently forwarding signals from the second source to the cleanup switch; initially buffering the first source signals in a first buffer of the cleanup switch; and, subsequently buffering the second source signals in a second buffer of the cleanup switch; wherein play from buffer 1 includes buffer 1 replay while buffer 2 is being loaded and play from buffer 2 begins after a start-of-frame is detected in buffer 2.

BRIEF DESCRIPTION OF THE DRAWINGS

The present invention is described with reference to the accompanying figures. The figures, incorporated herein and forming part of the specification, illustrate the present invention and, together with the description, further serve to explain the principles of the invention and to enable a person skilled in the relevant art to make and use the invention.

DETAILED DESCRIPTION OF THE PREFERRED EMBODIMENTS

The disclosure provided in the following pages describes examples of some embodiments of the invention. The designs, figures, and descriptions are non-limiting examples of certain embodiments of the invention. For example, other embodiments of the disclosed device may or may not include the features described herein. Moreover, disclosed advantages and benefits may apply to only certain embodiments of the invention and should not be used to limit the disclosed inventions.

Where parts are connected, descriptions herein using the words "coupled," "connected," or "interconnected" refer to either direct or indirect connections. Direct connections provide for a first part connected directly to a second part, for example A connected directly to B. Indirect connections provide for a first part connected indirectly to a second part, for example A connected indirectly to C via B.

Figure 1:
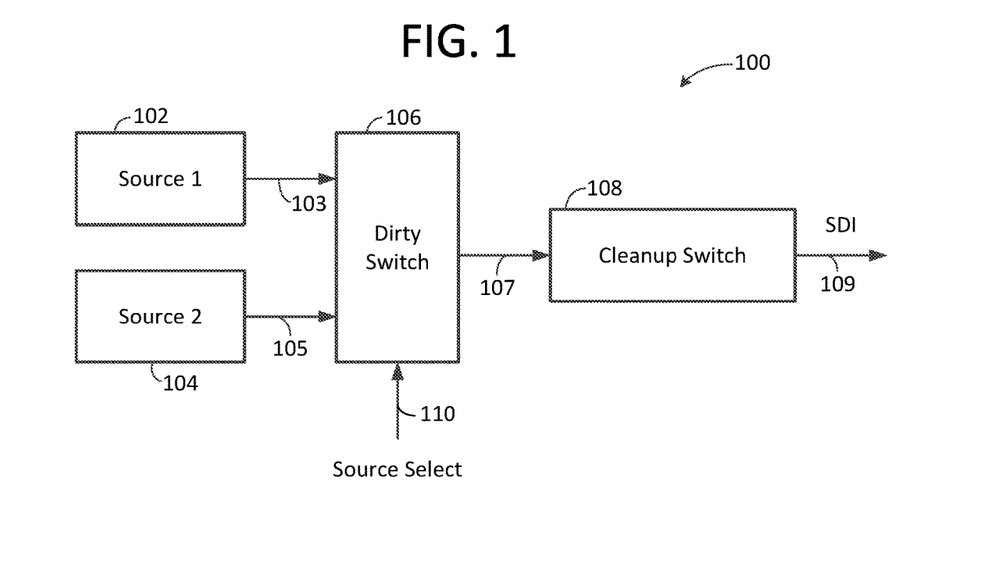
FIG. 1 shows an asynchronous switch system of the present invention.

FIG. 1 shows an asynchronous switch system of the present invention 100. A digital switch that does not provide for clean switching, that is a dirty switch, 106 selectively interconnects signal sources with a cleanup switch. Dirty switch operation may be controlled at least in part by a source select line or function 110.

For example, where there are first and second signal sources 102, 103 with respective source outputs 103, 105, the dirty switch 106 selectively interconnects either the first source or the second source with a cleanup switch 108 via a dirty switch output 107. The cleanup switch 108 mitigates signal disruptions introduced when the dirty switch switches from source 1 to source 2 or vice versa and provides a cleaned up output 109.

In various embodiments, the dirty switch 106 output 107 transports only one of the source signals 103, 105 at a time. And, in various embodiments operation of the dirty switch causes deselection of one source followed by selection of another source such that the dirty switch operates in a "break before make" mode.

Figure 2:
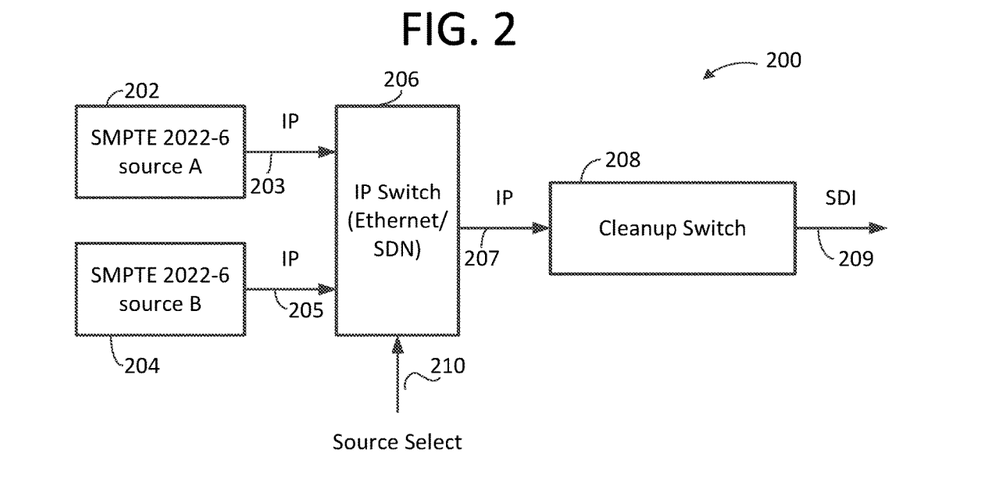
FIGS. 2-3 show asynchronous switch systems for handling serial digital interface signal sources.
Figure 3:
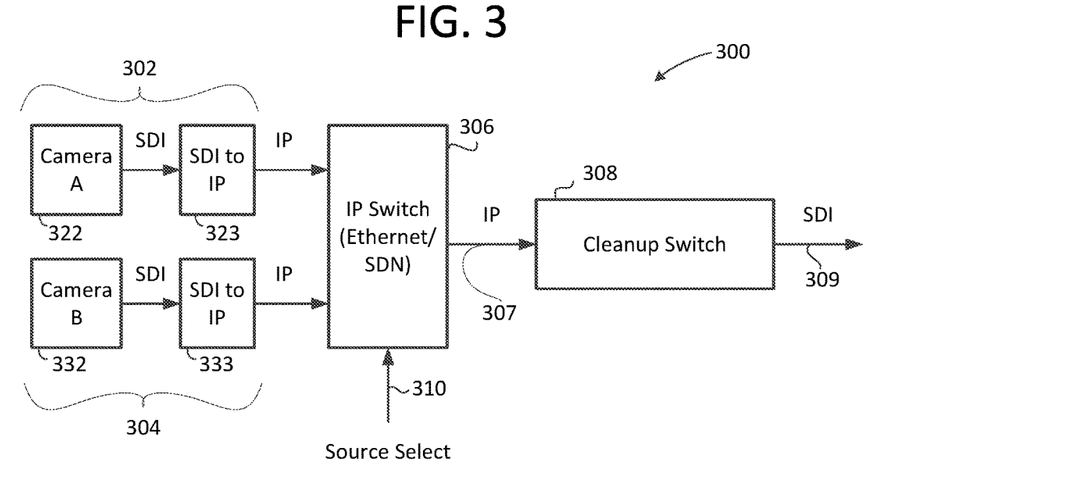

FIGS. 2-3 show asynchronous switch systems for handling serial digital interface signal sources 200-300.

In FIG. 2, a dirty switch for handling packetized traffic is provided. Exemplary switches include Ethernet/IP switches and SDN (software defined network) switches 206. Dirty switch operation may be controlled at least in part by a source select line or function 210.

IP outputs 203, 205 available from sources A, B (202, 204) interconnect with the dirty switch 206 and a dirty switch IP output 207 interconnects with a cleanup switch 208. In various embodiments, one or both of the sources A, B include an SDI to IP converter such as an SMPTE 2022-6 type converter.

The cleanup switch 208 mitigates signal disruptions introduced when the dirty switch 206 switches from source A to source B or vice versa and provides a cleaned up output such as a cleaned up SDI output 209.

In various embodiments, the dirty switch 206 output 207 transports only one of the source signals 203, 205 at a time. And, in various embodiments operation of the dirty switch causes deselection of one source followed by selection of another source such that the dirty switch operates in a "break before make" mode.

In FIG. 3, a dirty switch for handling packetized traffic is provided. Exemplary switches include Ethernet/IP switches and SDN (software defined network) switches 306. Dirty switch operation may be controlled at least in part by a source select line or function 310.

IP outputs 303, 305 available from sources 302, 304 interconnect with the dirty switch 206 and a dirty switch IP output 207 interconnects with a cleanup switch 208. Source 302 includes an SDI camera A (322) and an SDI to IP converter 323. Source 304 includes an SDI camera B (332) and an SDI to IP converter 333. In some embodiments, the SDI to IP converters 323, 333 are compliant with SMPTE 2022-6.

The cleanup switch 308 mitigates signal disruptions introduced when the dirty switch 306 switches from camera A to camera B or vice versa and provides a cleaned up output such as a cleaned up SDI output 309.

In various embodiments, the dirty switch 306 output 307 transports only one of the source signals 303, 305 at a time. And, in various embodiments operation of the dirty switch causes deselection of one source followed by selection of another source such that the dirty switch operates in a "break before make" mode.

Figure 4:
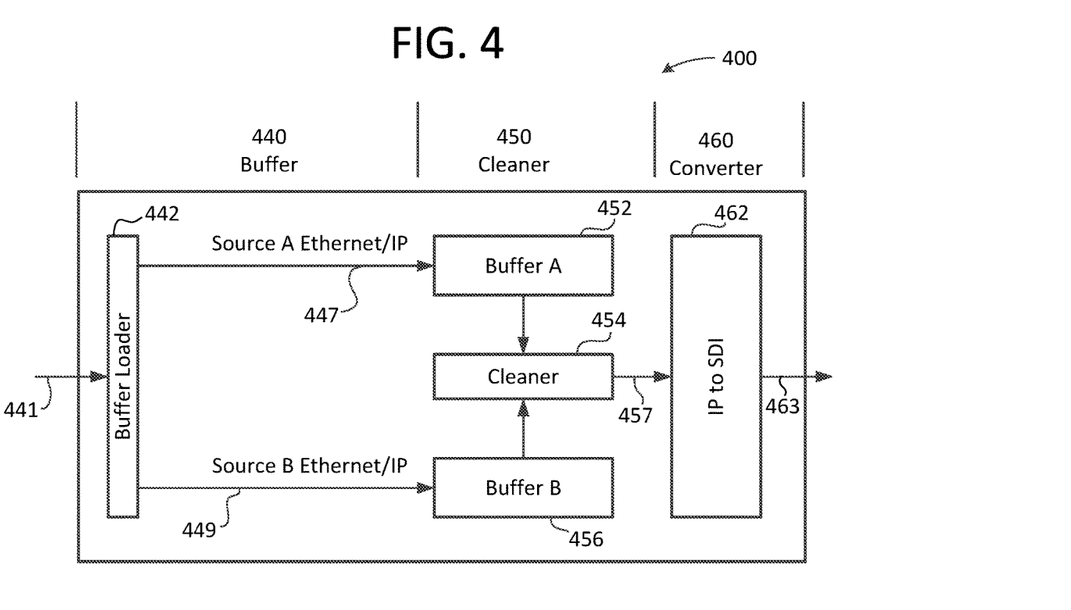
FIG. 4 shows an embodiment of a cleanup switch of the asynchronous switch system of FIG. 1.

FIG. 4 shows an embodiment of a cleanup switch 400. The cleanup switch includes a buffer loader section 440, a cleanup section 450, and an IP to SDI converter section. The buffer loader section includes a buffer loader 442, the cleaner section includes buffers A, B (452, 456) and a cleaner 454, and the converter section includes an IP to SDI converter 460.

The buffer loader 442 receives, via an Ethernet/IP input 441, a stream of video data, initially from a source A and subsequently from a source B with a time gap therebetween. When data from source A arrives at the buffer loader, the data is directed to buffer A via a first data line 447. When data from source B arrives at the buffer loader, the data is directed to buffer B via a second data line 449.

Data is received at the cleaner 454 initially from buffer A and subsequently from buffer B with a time gap therebetween. As described above and below, when the received data 441 switches from source A to source B, the cleaner loops/replays a portion of buffer A while buffer B is receiving data. When buffer B includes a start of video frame boundary, the cleaner jumps from buffer A to the start of the video frame detected in buffer B.

As a consequence of switching from source A to source B, a cleaner output 457 is initially source A data and subsequently source B data played, out by the cleaner in a manner that mitigates picture or video disruptions.

In the converter section 460, the IP to SDI converter receives the cleaner IP output 457 and converts it to a converter serial digital interface output.

Figure 5:
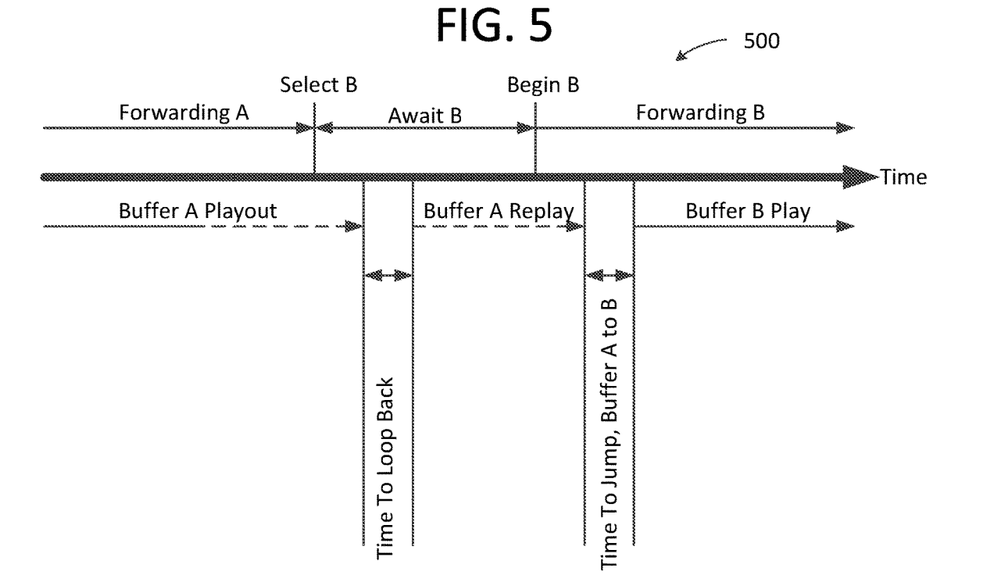
FIGS. 5-6 show a method of asynchronous switching of the asynchronous switch system of FIG. 1.
Figure 6:
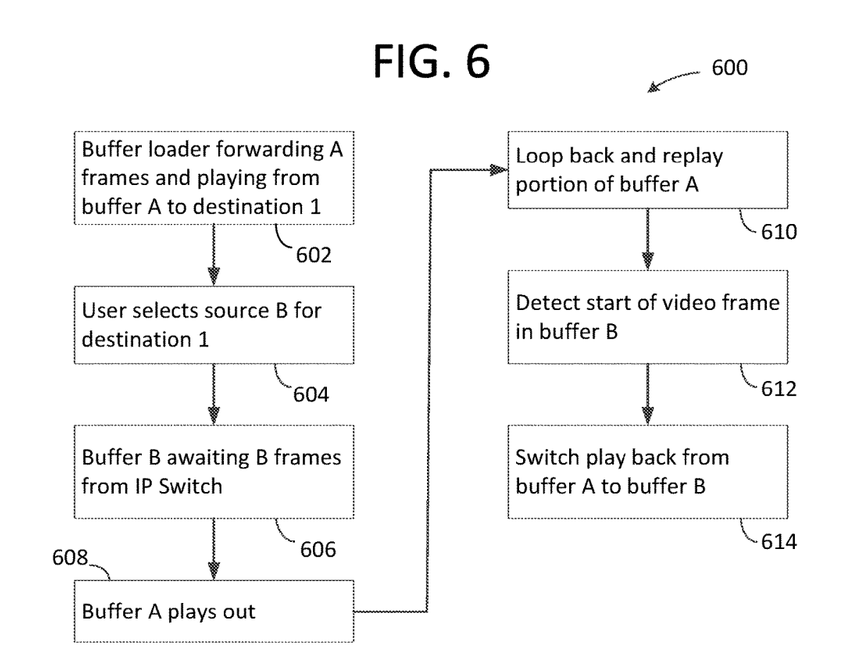

FIGS. 5-6 show a method of asynchronous switching of the present invention. In particular, FIG. 5 shows a switching timeline 500 and FIG. 6 shows a switching flowchart 600.

In the timeline, forwarding A indicates video data A is being forwarded to a cleaner similar to the cleaner 454 of FIG. 4 ("cleaner"). In the flowchart, the corresponding step 602 is buffer loader forwarding A frames and playing from buffer A to a destination such as destination 1.

In the timeline, select B indicates that the video source is switched from source A to source B. In the flowchart, the corresponding step 604 is user selects source B for destination 1.

In the timeline, await B indicates buffer B is awaiting video data from source B. In the flowchart, the corresponding step 606 is buffer B awaits B frames from buffer loader.

In the timeline and the flowchart, buffer A playout 608 indicates that buffer A plays out before the await B step completes.

In the timeline, a portion of buffer A is replayed during the await B step. In the flowchart, the corresponding step 610 is loop back and replay portion of buffer A.

During the buffer A replay step 610, data from source B begins to arrive as shown in the timeline. This source B data is forwarded to buffer B. A signal for a cleaner read pointer to jump from playing buffer A to playing buffer B occurs when a video frame start boundary is detected in buffer B. As seen in the flowchart, this detection occurs in step 612 and the cleaner read pointer jump occurs in step 614.

Figure 7:
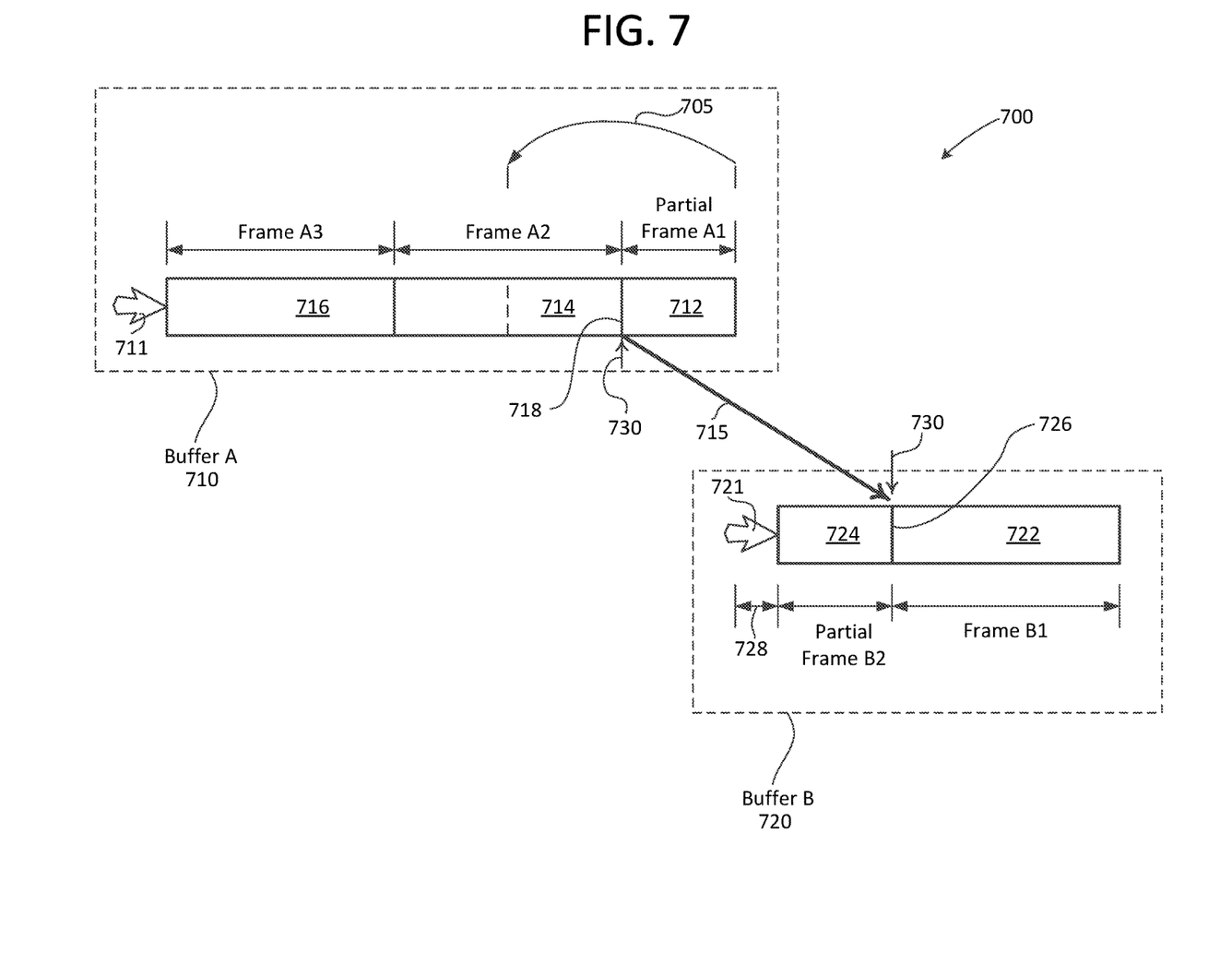
FIG. 7 shows an exemplary low latency frame switching diagram of the asynchronous switch system of FIG. 1

FIG. 7 shows an exemplary low latency frame switching diagram of the present invention 700. As seen, buffer A (710) is loaded by source A (711) and includes partial frame A1 (712), frame A2 (714), and frame A3 (716), the same indicating a buffer embodiment with a capacity of less than three frames. Buffer B (720) is loaded by source B (721) and includes frame B1 (722) and partial frame B2 (724), the same indicating a buffer embodiment with a capacity of less than two frames.

When the video source is switched from source A to source B, a portion of buffer A, in some embodiments the last frames worth of data (as shown), is replayed before playback from buffer B is available. The start of the replay data portion of buffer A is indicated by the arrow on loop back 705. As seen, the replay data indicated by the loop back is typically not a full/integral frame, rather the loop back encompasses data from each of adjacent frames A1, A2.

When a start-of-frame 726 is detected in buffer B, a read pointer can jump from buffer A to the detected start-of-frame in buffer A. For example, upon detection of a start-of-frame 726 in buffer B, a read pointer 730 continues play from buffer A until a buffer A end of frame 718 is reached. At this point, the read pointer 730 jumps to the detected start-of-frame 726 in buffer B and commences play from buffer B.

In various embodiments, the video frames of buffers A and B need not be aligned. And, in various embodiments no overlap of the buffers is required and a gap in time 728 may exist between the initial playout of buffer A and the time when buffer B loading begins.

Figure 8:
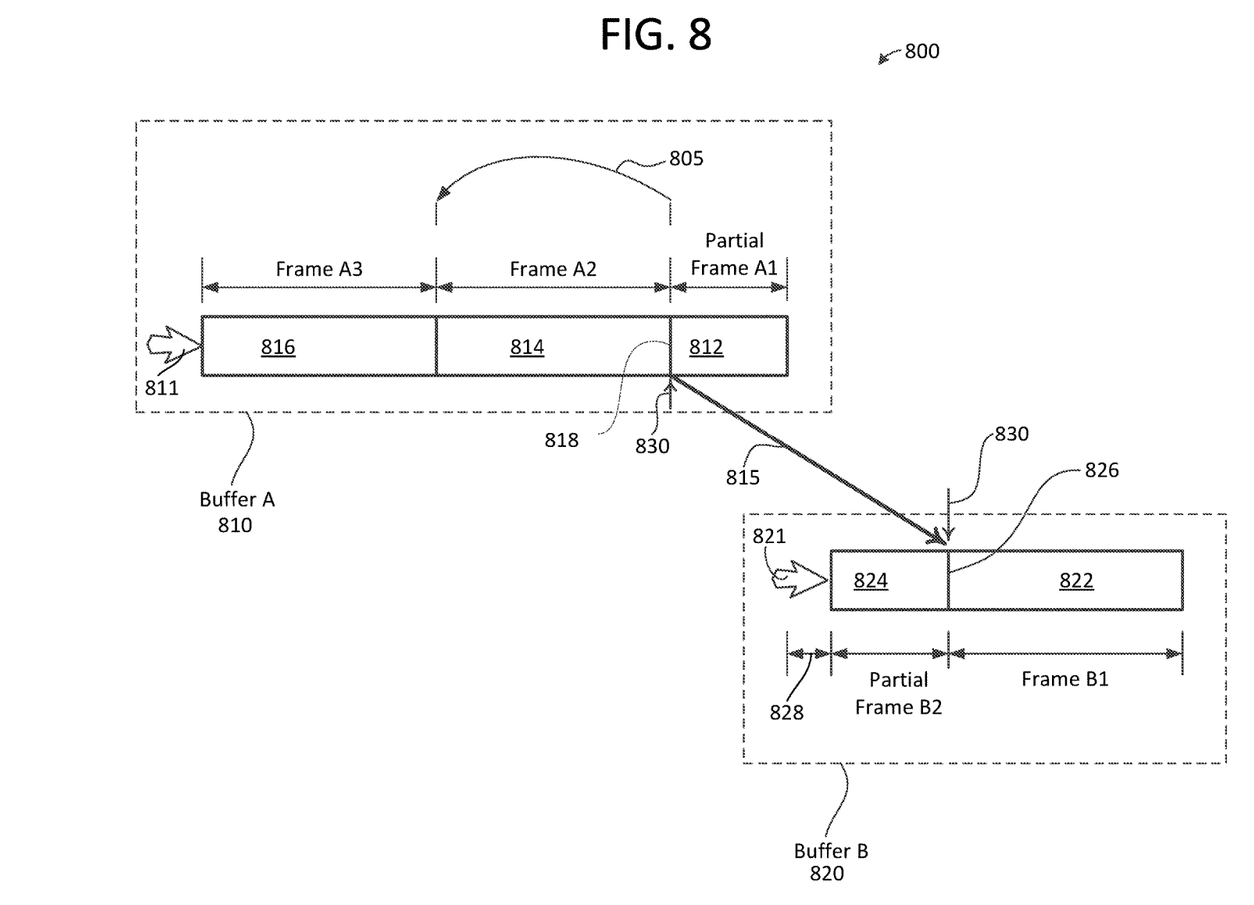
FIG. 8 shows an exemplary intermediate latency frame switching diagram of the asynchronous switch system of FIG. 1.

FIG. 8 shows an exemplary intermediate latency frame switching diagram of the present invention 800. As seen, buffer A (810) is loaded by source A (811) and includes partial frame A1 (812), frame A2 (814), and frame A3 (816), the same indicating a buffer embodiment with a capacity of less than three frames. Buffer B (820) is loaded by source B (821) and includes frame B1 (822) and partial frame B2 (824), the same indicating a buffer embodiment with a capacity of less than two frames.

When the video source is switched from source A to source B, a portion of buffer A, in some embodiments the last full/integral frame of data (as shown), is replayed before playback from buffer B is available. The start of the replay data portion of buffer A is indicated by the arrow on loop back 805. Loop back to the beginning of a frame, here frame A2, provides for an integer frame wrap but typically higher latency as compared to the example of FIG. 7.

When a start-of-frame 826 is detected in buffer B, a read pointer can jump from buffer A to the detected start-of-frame in buffer A. For example, upon detection of a start-of-frame 826 in buffer B, a read pointer 830 continues play from buffer A until a buffer A end of frame 818 is reached. At this point, the read pointer 830 jumps to the detected start-of-frame 826 in buffer B and commences play from buffer B.

In various embodiments, the video frames of buffers A and B need not be aligned. And, in various embodiments no overlap of the buffers is required and a gap in time 828 may exist between the initial playout of buffer A and the time when buffer B loading begins.

Figure 9:
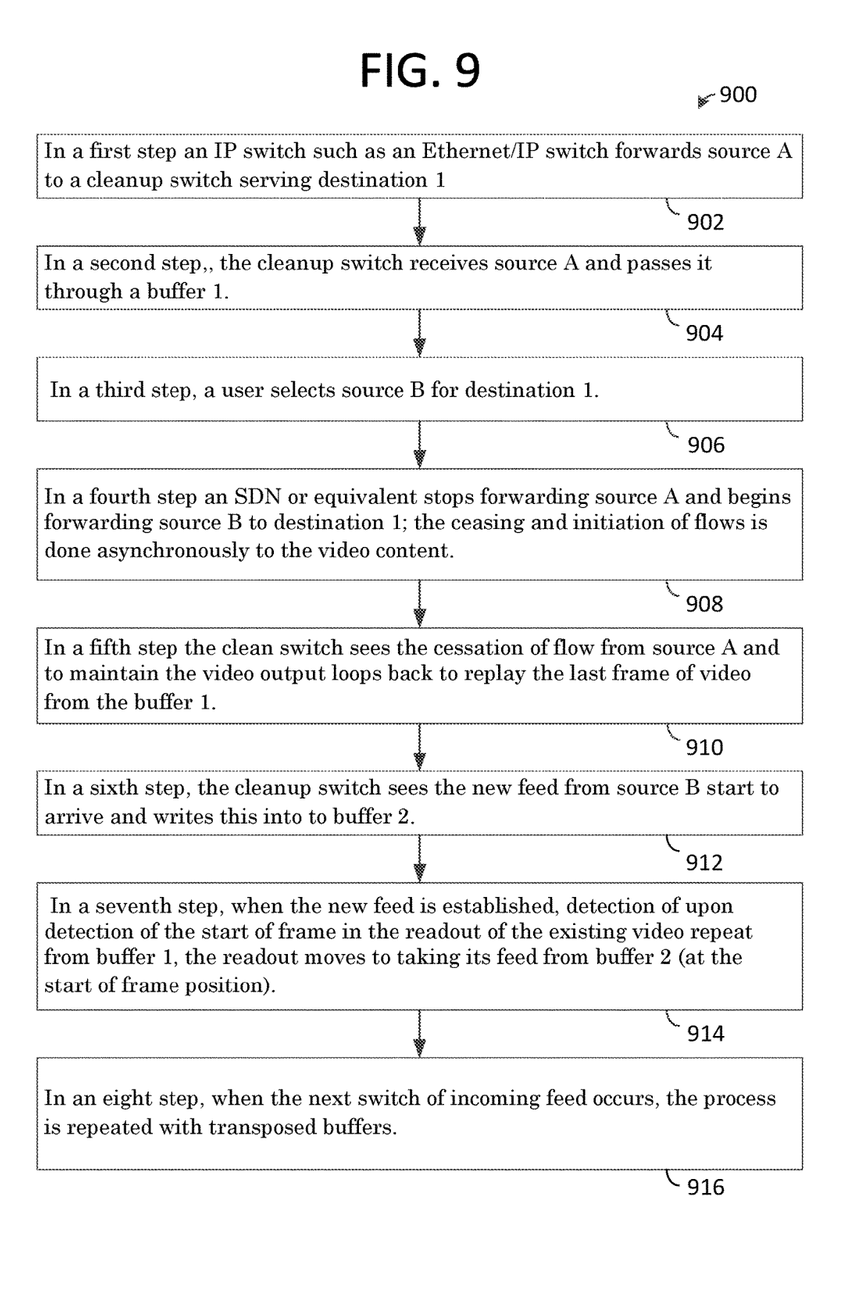
FIG. 9 shows an exemplary switching methodology of the asynchronous switch system of FIG. 1.

FIG. 9 shows and exemplary switching methodology 900. In a first step 902 an IP switch such as an Ethernet/IP switch forwards source A to a cleanup switch serving destination 1. In a second step 904, the cleanup switch receives source A and passes it through a buffer 1. In a third step 906, a user selects source B for destination 1. In a fourth step 908 an SDN or equivalent stops forwarding source A and begins forwarding source B to destination 1; the ceasing and initiation of flows is done asynchronously to the video content. In a fifth step 910 the clean switch sees the cessation of flow from source A and to maintain the video output loops back to replay the last frame of video from the buffer 1. In a sixth step 912, the cleanup switch sees the new feed from source B start to arrive and writes this into to buffer 2. In a seventh step 914, when the new feed is established, upon detection of the start-of-frame in the readout of the existing video repeat from buffer 1, the readout moves to taking its feed from buffer 2 (at the start-of-frame position). In an eight step 916, when the next switch of incoming feed occurs, the process is repeated with transposed buffers.

The appendix to this application provides descriptions of similar and/or other embodiments of the present invention.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

What is claimed is:

1. An asynchronous switch for cleaning video signal source transitions, the switch comprising:
   a buffer loader for receiving internet protocol video signals IPA, IPB from video sources A and B;
   buffers A, B for buffering signals IPA, IPB;
   a cleaner for receiving the buffered IP signals and constructing a cleanly transitioned IP signal available at a cleaner output; and,
   an IP to SDI converter for converting the cleaned output signal to an SDI format;
   wherein
      i) in time period p1 buffer A receives and plays out X frames of signal IPA,
      ii) in time period p2 buffer B receives Y frames of signal IPB,
      iii) the playout of the X frames is followed by replay from the X frames during period p2, and
      iv) play from buffer B begins after a start-of-frame is detected in buffer B.

2. The switch of claim 1 wherein buffer A replay begins at substantially the same time that source B forwarding begins.

3. The switch of claim 1 wherein the buffer A replay includes replay from portions of two different frames.

4. The switch of claim 1 wherein the buffer A replay does not include replay from portions of two different frames.

5. The switch of claim 1 wherein the buffer A replay length is more than one frame but less than three frames requiring a buffer capacity in excess of two frames.

6. The switch of claim 5 wherein a buffer B detection length is more than one frame but less than two frames requiring a buffer capacity in excess of one frame.

7. An asynchronous video signal switching method comprising the steps of:
   providing an SDI signal source A and an SDI signal source B;
   coupling the signal sources to an SDI to IP converter block;
   coupling the converter block to an IP switch;
   a cleanup switch causing the IP switch to forward a selected one of the converted signals to the cleanup switch;
   initially forwarding source A signals to the cleanup switch and buffering source A signals in a first buffer of the cleanup switch; and,
   subsequently forwarding source B signals to the cleanup switch and buffering source B signals in a second buffer of the cleanup switch;
   wherein play and replay from buffer A occurs while buffer B is being loaded and play from buffer B begins after a start-of-frame is detected in buffer B.

8. The method of claim 7 wherein buffer A replay begins when signal source B forwarding begins.

9. The method of claim 7 wherein the buffer A replay includes replay from portions of two different frames.

10. The method of claim 7 wherein the buffer A replay does not include replay from portions of two different frames.

11. The method of claim 7 wherein the buffer A replay length is more than one frame but less than three frames, such that a buffer length of at least more than one frame but less than three frames is required.

12. The method of claim 11 wherein a buffer B detection length is more than one frame but less than two frames, such that a buffer length of at least more than one frame but less than two frames is required.

13. An asynchronous video signal switching method comprising the steps of:
   an IP switch forwarding a video signal A to a cleanup switch;
   the cleanup switch receiving video signal A into buffer A and reading from buffer A to play the signal out;

with respect to content of video signals A and B, asynchronously ceasing to forward video signal A and beginning to forward video signal B;

responding to cessation of forwarding of video signal A, the cleanup switch looping back to a start of the last complete frame nearest an output of buffer A in order to continue reading from buffer A;

the cleanup switch recognizing receipt of a new video signal B and forwarding it to buffer B; and, upon detecting a start-of-frame in buffer B, the cleanup switch reading from the start-of-frame of buffer B and playing from buffer B.

14. The method of claim 13 wherein buffer A replay begins when signal source B forwarding begins.

15. The method of claim 13 wherein buffer A replay includes replay from portions of two different frames.

16. The method of claim 13 wherein the buffer A replay does not include replay from portions of two different frames.

17. The method of claim 13 wherein the buffer A replay length is more than one frame but less than three frames, such that a buffer length of at least more than one frame but less than three frames is required.

18. The method of claim 17 wherein a buffer B detection length is more than one frame but less than two frames, such that a buffer length of at least more than one frame but less than two frames is required.

\* \* \* \* \*